United States Patent Office
3,157,783
Patented Nov. 17, 1964

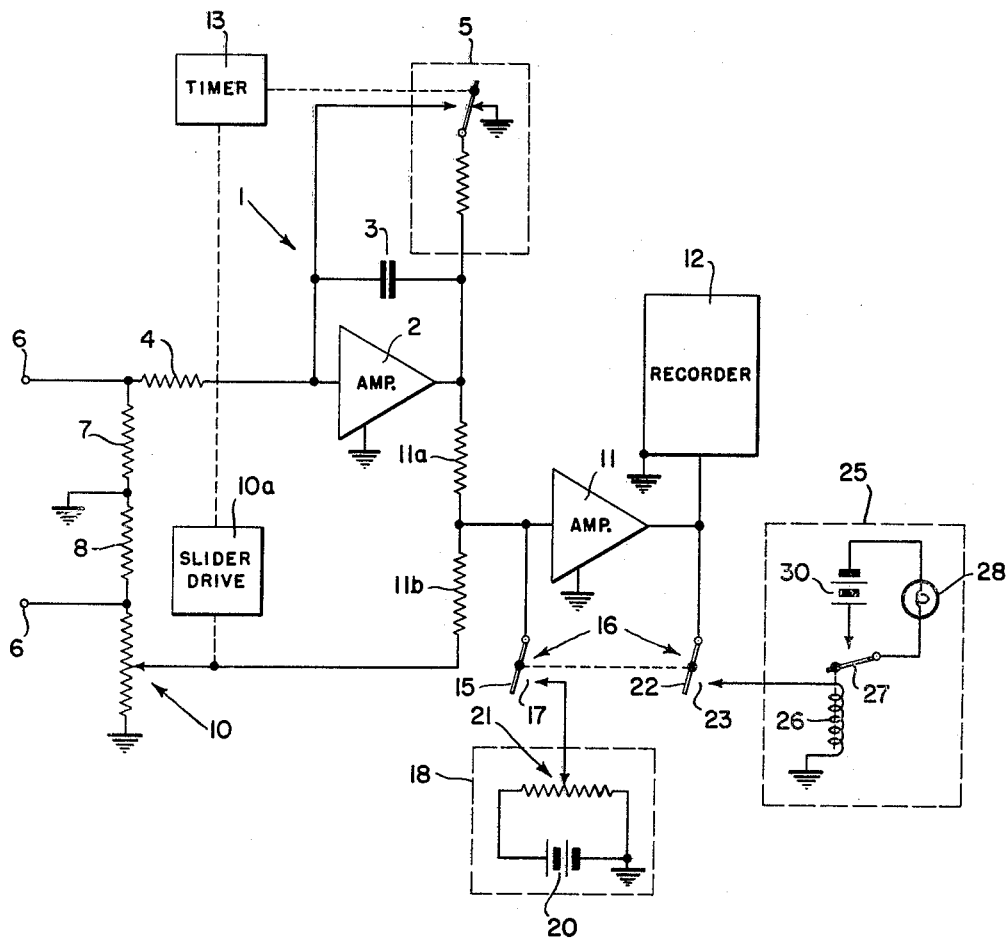

3,157,783
UTILIZATION LEVEL PREDICTOR
Thomas A. Patchell, Havertown, and Thomas V. Redding-
ton, Jr., Levittown, Pa., assignors to Honeywell Inc.,
a corporation of Delaware
Filed Mar. 24, 1960, Ser. No. 17,389
10 Claims. (Cl. 235—193)

This invention relates to electrical computing circuits. More specifically, the present invention relates to a variable-quantity utilization predictor.

An object of the present invention is to provide a utilization predictor for computing the utilization level of a variable during a utilization period.

Another object of the present invention is to provide a utilization level predictor which is capable of indicating an abnormal or a normal level of utilization for the utilization period.

A further object of the present invention is to provide a utilization level predictor which is capable of recording the predicted utilization level for the utilization period.

A still further object of the present invention is to provide a utilization level predictor, as set forth, which is characterized by simplicity of operation and construction.

In accomplishing these and other objects, there has been provided, in accordance with the present invention, a utilization level predictor having particular utility in predicting the amount of a measured variable consumed during a utilization period. The utilization level predictor comprises an electrical integrator for integrating a signal representative of the quantity of a measured variable which has been utilized since the start of the utilization period and a multiplier circuit including a potentiometer for multiplying the representative input signal to the integrator by the amount of time remaining in the utilization period. The output signals from the integrator and the multiplier are summed in a summing amplifier. The output signal from the summing amplifier is applied to a signal responsive circuit to indicate the total predicted consumption of the measured variable during the utilization period.

A better understanding of the present invention may be had from the following detailed description when read in connection with the accompanying single drawing which is a schematic diagram of a utilization predictor embodying the present invention.

Referring to the single drawing in more detail, there is shown a utilization predictor having an electrical integrator 1. The electrical integrator 1 illustrated in the single figure comprises a combination of an operational amplifier 2 having a feedback capacitor 3 and an input resistor 4 associated therewith. A shorting switch circuit 5 is used to discharge the feedback capacitor 3 at the end of each integrating period. The operation of such an electrical integrator is well-known in the art.

Briefly, this type of integrator integrates an input signal by accumulating a charge on the feedback capacitor to represent a summation of the input signal during a period of time; i.e., an integrating period. The operational amplifier is used to linearize the charging operation of the feedback capacitor and to obviate the opposition of the accumulated charge with respect to the input signal. The shorting switch is operated at the end of the integrating period to discharge the feedback capacitor in preparation for a new integrating operation.

A pair of input terminals 6 are provided for connection to a source of a direct current signal representative of a measured variable. A pair of signal-dividing resistors 7 and 8 are connected in series across the input terminals 6 to divide the input signal applied thereto. The common junction between this serial combination is connected to a common ground with the operational amplifier 2. One of the input terminals 6 is connected to the input resistor 4 of the operational amplifier 2. The other one of the input terminals 6 is connected to one end of a multiplying potentiometer 10. The other end of the potentiometer 10 is connected to the aforesaid common ground connection. The slider of the potentiometer 10 is automatically and uniformly driven by a slider drive means 10a and is electrically connected to the input circuit of a summing amplifier 11 through a first input resistor 11b.

The slider drive means 10a may be any suitable device capable of automatically driving the slider of the potentiometer 10 from a first point to a second point on the potentiometer 10 and returning the slider to the first point in response to a control signal. Additionally, the output signal from the integrator 1 is connected to the input circuit of the summing amplifier 11 through a second input resistor 11a. The summing amplifier 11 may be any suitable one of many electronic devices capable of responding to the sum of a plurality of input signals applied thereto. The output signal from the summing amplifier 11 is applied to a recorder 12 which is capable of recording this output signal. A timer 13 is provided for synchronously and periodically operating the shorting switch 5 and the slider drive means 10a. The timer 13 is arranged to momentarily close the shorting switch 5 at the end of the integrating period and, concurrently, to control the slider drive means 10a to effect a return of the slider of the potentiometer 10 to a first position.

The input circuit of the summing amplifier 11 is also connected to a first blade 15 of a double-pole, single-throw switch 16. The corresponding first terminal 17 is connected to a reference signal source 18. The reference signal source 18 may comprise, as shown in the single figure, a battery 20 having a reference potentiometer 21 connected thereacross. The slider of the reference potentiometer 21 is connected to the above-mentioned first terminal 17.

A second blade 22 of the switch 16 is connected to the output circuit of the summing amplifier 11. The corresponding second terminal 23 is connected to an alarm circuit 25. The alarm circuit may comprise a relay coil 26 responsive to the output signal from the summing amplifier 11, a relay operated contact 27 an alarm light 28 and a battery 30 for lighting the light 28 through the relay contact 27.

The mode of operation of the present invention, shown in the single figure, follows:

Assume the switch 16 is in the position shown in the drawing and the input signal applied to the input terminals 6 is representative of the consumption of electrical energy. The input resistors 7 and 8 are arranged to divide the input signal into two equal parts. Accordingly, half of the input signal is applied to integrator 1 since the ground connection thereof is connected to the common point between the input resistors 7 and 8, as previously mentioned. Similarly, the other half of the input signal appears across the multiplying potentiometer 10.

As previously discussed, the shorting switch 5 is momentarily closed by the timer 13 at the end of an integrating period to discharge the feedback capacitor 3. The drive means 10a for the slider of the multiplying potentiometer 10 is arranged to automatically and uniformly drive the slider from an ungrounded first end of the potentiometer 10 to a grounded second end in the time corresponding to the integrating period. Further, the drive means 10a is arranged to return the slider of the potentiometer 10 to the first end of the potentiometer 10 in response to a control signal from the timer 13 before the start of the next integrating period; i.e., during the time the feedback capacitor 3 is discharging. Thus, the position of the slider is representative of the time remaining in the integration period. Accordingly, the instantaneous signal appearing at the slider of the potentiometer 10 is representative of the electrical energy to be consumed during the remainder of the time period, assuming a continuing electrical consumption at the rate measured at any instant. The integration of the signal applied to the integrator 1 represents the total electrical energy consumed since the start of the integration period. The summing of these two representative signals, accordingly, is effective to produce a signal which corresponds to the energy to be utilized during the entire integration period. Thus, the computing circuit of the present invention predicts the electrical energy consumption for the time period at every instant during the time period. The aforesaid summing operation is performed by the summing amplifier 11 and the output signal thereof, corresponding to the predicted energy consumption, is applied to the recorder 12. The recorded predicted energy consumption can then be compared with a desired utilization level.

The apparatus of the present invention may also be used as an alarm indicator for a continuous instantaneous comparison of the predicted utilization level with a desired utilization level. Assume the switch 16 is in its closed position; i.e., the blades 15 and 22 making contact with the corresponding terminals 17 and 23. The operation of the integrator 1 and the multiplying potentiometer 10 is similar to that described above for use as a non-alarm indicating utilization predictor. Additionally the slider of the reference potentiometer 21 is preset to a position which is effective to apply a desired reference signal to the input circuit of the summing amplifier 11. The reference signal is representative of a desired utilization level which level corresponds to the instantaneous sum of the consumed and predicted utilization signals appearing at the input circuit of the summing amplifier 11. The reference signal is arranged to subtract from the sum of the aforesaid signals to produce a zero input signal level to the summing amplifier 11 at the desired utilization level. The result of a deviation of the predicted utilization level from the desired level is to produce a net input signal to the summing amplifier 11. The amplifier 11 is effective to amplify this signal and to apply the amplified signal to the recorder 12 and the alarm circuit 25. This amplifier output signal is effective to energize the relay coil 26 whereby the relay contacts 27 are closed, and the alarm light 28 is activated. Upon a return of the predicted utilization level to the desired level, the input signal to the summing amplifier 11 is returned to a zero level, and the alarm light 28 is deactivated.

Thus, it may be seen that there has been provided, in accordance with the present invention, a utilization predictor which is characterized by the ability to record a predicted utilization level and to indicate an abnormal or a normal level of utilization.

What is claimed is:

1. A utilization level predictor comprising, in combination, means for connecting to a source of a signal representative of the rate of utilization of a measured variable, integrator means for integrating an input signal during an integration period, multiplier means for multiplying a first signal by a second signal, means for applying a first portion of said signal representative of the rate of utilization of a measured variable to said integrator means, means for applying a second portion of said last-mentioned signal to said multiplier means as a first signal, means for applying a second signal to said multiplier means, said second signal being representative of the amount of time remaining in said integration period, and summing means for summing an output signal from said integrator means and from said multiplier means for producing an output signal representative of the sum of the input signals to said summing means.

2. A utilization level predictor comprising, in combination, means for connecting to a source of a signal representative of the rate of utilization of a measured variable, said means including a pair of input terminals for connection to a source of signals representative of the rate of utilization of a measured variable and a series combination of two resistors connected across said input terminals, integrator means for integrating an input signal during an integration period, multiplier means for multiplying a first signal by a second signal, means for applying a first portion of said signal representative of the rate of utilization of a measured variable to said integrator means, means for applying a second portion of said last-mentioned signal to said multiplier means as a first signal, means for applying a second signal to said multiplier means, said second signal being representative of the amount of time remaining in said integration period, and summing means for summing an output signal from said integrator means and from said multiplier means for producing an output signal representative of the sum of the input signals to said summing means.

3. A utilization level predictor comprising, in combination, means for connecting to a source of a signal representative of the rate of utilization of a measured variable, said means including a pair of input terminals for connection to a source of signals representative of the rate of utilization of a measured variable and a series combination of two resistors connected across said input terminals, integrator means for integrating an input signal during an integration period, multiplier means for multiplying a first signal by a second signal, said multiplier means including a potentiometer, means for applying a signal appearing across one resistor of said series combination of two resistors to said integrator means, means for applying a signal appearing across the other resistor of said series combination of two resistors across said potentiometer as a first signal, slider drive means for automatically and uniformly driving a slider of said potentiometer from a first end to a second end of said potentiometer, said uniform driving being representative of a second signal corresponding to the amount of time remaining in the integration period, and summing means for summing an output signal from said integrator means and from said multiplier means to produce an output signal representative of the sum of the input signals to said summing means.

4. A utilization level predictor comprising, in combination, means for connecting to a source of a signal representative of the rate of utilization of a measured variable, said means including a pair of input terminals for connection to a source of signals representative of the rate of utilization of a measured variable and a series combination of two resistors connected across said input terminals, integrator means for integrating an input signal during an integration period, said integrator means including an operational amplifier having a feedback capacitor associated therewith and a shorting circuit for shorting said feedback capacitor, multiplier means for multiplying a first signal by a second signal, said multiplier means including a potentiometer, means for applying a signal appearing across one resistor of said series combination of two resistors to said integrator means, means for applying a signal appearing across the other resistor of said series combination of two resistors across said potentiometer as a first signal, slider drive means for automatically and uniformly driving a slider of said potentiometer from a first end to a second end of said potentiometer, said uniform driving being representative of a second signal corresponding to the amount of time remaining in the integration period, timing means for synchronously actuating said shorting circuit to discharge said feedback capacitor and controlling said slider drive means to return said slider to said first end at the end of the integration period, and summing means for summing an output signal from said integrator means and from said multiplier means to produce an output signal representative of the sum of the input signals to said summing means.

5. A utilization level predictor comprising, in combination, means for connecting to a source of a signal representative of the rate of utilization of a measured variable, said means including a pair of input terminals for connection to a source of signals representative of the rate of utilization of a measured variable and a series combination of two resistors connected across said input terminals, integrator means for integrating an input signal during an integration period, said integrator means including an operational amplifier having a feedback capacitor associated therewith and a shorting circuit for shorting said feedback capacitor, multiplier means for multiplying a first signal by a second signal, said multiplier means including a potentiometer, means for applying a signal appearing across one resistor of said series combination of two resistors to said integrator means, means for applying a signal appearing across the other resistor of said series combination of two resistors across said potentiometer as a first signal, slider drive means for automatically and uniformly driving a slider of said potentiometer from a first end to a second end of said potentiometer, said uniform driving being representative of a second signal corresponding to the amount of time remaining in the integration period, reference signal means for producing a reference signal representative of a desired utilization level, said reference signal being equal to the sum of an output signal from said integrator means and from said multiplier means at the desired utilization level and having an opposite polarity to the aforementioned sum, summing for algebraically summing said reference signal and the output signals from said integrator means and from said multiplier means and indicating means responsive to an output signal from said summing means representative of the algebraic sum of the input signals to said summing means.

6. A utilization level predictor comprising in combination, means for connecting to a source of a signal representative of the rate of utilization of a measured variable, said means including a pair of input terminals for connection to a source of signals representative of the rate of utilization of a measured variable and a series combination of two resistors connected across said input terminals, integrator means for integrating an input signal during an integration period, said integrator means including an operational amplifier having a feedback capacitor associated therewith and a shorting circuit for shorting said feedback capacitor, multiplier means for multiplying a first signal by a second signal, said multiplier means including a potentiometer, means for applying a signal appearing across one resistor of said series combination of two resistors to said integrator means, means for applying a signal appearing across the other resistor of said series combination of two resistors across said potentiometer as a first signal, slider drive means for automatically and uniformly driving a slider of said potentiometer from a first end at the end of the integration period, reference signal means for producing a reference signal representative of a desired utilization level, said reference signal being equal to the sum of an output signal from said integrator means and from said multiplier means at the desired utilization level and having an opposite polarity to the aforementioned sum, summing for algebraically summing said reference signal and the output signals from said integrator means and from said multiplier means and indicating means responsive to an output signal from said summing means representative of the algebraic sum of the input signals to said summing means.

7. A utilization level predictor comprising, in combination, input signal means for applying from a source of a signal representative of the rate of utilization of a measured variable a first portion signal and a second portion signal, said first and said second portion signals being representative of the rate of utilization of a measured variable, integrator means for integrating an input signal during an integration period, multiplier means for multiplying a first signal by a second signal, means for applying said first portion signal to said integrator means, means for applying said second portion signal to said multiplier means as a first signal, means for applying a second signal to said multiplier means, said second signal being representative of the amount of time remaining in said integration period, and summing means for summing an output signal from said integrator means and from said multiplier means to produce an output signal representative of the sum of the input signals to said summing means.

8. A utilization level predictor comprising, in combination, input signal means for connecting from a source of a signal representative of the rate of utilization of a measured variable a first portion signal and a second portion signal, said first and said second portion signals being represeentative of the rate of utilization of a measured variable, integrator means for integrating an input signal during an integration period, multiplier means for multiplying a first signal by a second signal, means for applying said first portion signal to said integrator means, means for applying said second portion signal to said multiplier means as a first signal, means for applying a second signal to said multiplier means, said last-mentioned second signal being representative of the amount of time remaining in said integration period, reference signal means for producing a reference signal representative of a desired utilization level, said reference signal being equal to the sum of an output signal from said integrator means and an output signal from said multiplier means at the desired utilization level and having an opposite polarity to the aforementioned sum, summing means for algebraically summing said reference signal and the output signals from said integrator means and from said multiplier means and indicating means responsive to an output signal from said summing means representative of the algebraic sum of the input signals to said summing means.

9. A utilization level predictor comprising, in combination, a first input signal means for connecting to a source of a first input signal, a second input signal means for connecting to a source of a second input signal, said first signal and said second signal being representative of the rate of utilization of a measured variable, integrator means for integrating an input signal during an integration period, multiplier means for multiplying a first signal by a second signal, means for applying said first input signal to said integrator means, means for applying said second input signal to said multiplier means as a first signal, means for applying a second signal to said multiplier means, said last-mentioned second signal being representative of the amount of time remaining in said integration period, and summing means for summing an output signal from said integrator means and from said multiplier means to produce an output signal representative of the sum of the input signals to said summing means.

10. A utilization level predictor comprising, in combination, a first input signal means for connecting to a source of a first input signal, a second input signal means for connecting to a source of a second input signal, said first signal and said second signal being representative of the rate of utilization of a measured variable, integrator means for integrating an input signal during an integration period, multiplier means for multiplying a first signal by a second signal, means for applying said first input signal to said integrator means, means for applying said second input signal to said multiplier means as a first signal, means for applying a second signal to said multiplier means, said last-mentioned second signal being representative of the amount of time remaining in said integration period, reference signal means for producing a reference signal representative of a desired utilization level, said reference signal being equal to the sum of an output signal from said integrator means and an output signal from said multiplier means at the desired utilization level and having an opposite polarity to the aforementioned sum, summing means for algebraically summing said reference signal and the output signals from said integrator means and from said multiplier means and indicating means responsive to an output signal from said summing means representative of the algebraic sum of the input signals to said summing means.

References Cited in the file of this patent

UNITED STATES PATENTS

| | | |
|---|---|---|
| 2,678,425 | Hoeppner | May 11, 1954 |
| 2,967,018 | Fogarty | Jan. 3, 1961 |
| 2,967,749 | Strickler | Jan. 10, 1961 |
| 3,008,640 | Hamblin et al. | Nov. 14, 1961 |
| 3,016,197 | Newbold | Jan. 9, 1962 |